United States Patent [19]

Ise et al.

[11] Patent Number: 4,622,535
[45] Date of Patent: Nov. 11, 1986

[54] RECEIVING CIRCUIT FOR A DATA TRANSMISSION SYSTEM

[75] Inventors: Hasahiro Ise, Kashihara; Hidehiko Tanaka, Tenri; Katsuyuki Machino, Nara; Toshiyuki Matsubara; Teiji Terasaka, both of Tenri, all of Japan

[73] Assignee: Sharp Kabushiki Kaisha, Osaka, Japan

[21] Appl. No.: 483,252

[22] Filed: Apr. 8, 1983

[30] Foreign Application Priority Data

Apr. 14, 1982 [JP] Japan ................................. 57-62785

[51] Int. Cl.[4] ......................................... H04M 11/00
[52] U.S. Cl. ................... 340/310 R; 324/127; 340/870.32; 361/79.
[58] Field of Search .......... 340/310 R, 310 A, 870.31, 340/870.32; 307/3, 140; 361/65, 79; 324/127, 126; 179/2.51

[56] References Cited

U.S. PATENT DOCUMENTS

| | | | |
|---|---|---|---|
| 3,719,928 | 3/1973 | Oishi | 340/310 R |
| 3,986,115 | 10/1976 | Huang | 361/79 |
| 4,183,072 | 1/1980 | Takagi | 361/79 |
| 4,281,386 | 7/1981 | Kondow | 361/79 |
| 4,438,396 | 3/1984 | Harnden | 324/127 |
| 4,504,705 | 3/1985 | Pillond | 340/310 R |

Primary Examiner—John W. Caldwell, Sr.
Assistant Examiner—Michael F. Heim
Attorney, Agent, or Firm—Birch, Stewart, Kolasch and Birch

[57] ABSTRACT

A data transmission system for transmitting and receiving data over a transmission line includes a receiving station having a receiving circuit for simultaneously detecting current and voltage signals including the data in the transmission line and applying these signals to a common output impedance, so that an output voltage signal developed across the output impedance will have a sufficient signal level irrespective of the value of other load impedances on the transmission line.

4 Claims, 5 Drawing Figures

RECEIVING CIRCUIT FOR A DATA TRANSMISSION SYSTEM

BACKGROUND OF THE INVENTION

The present invention relates to a system for transmitting and receiving data over a transmission wiring or lines, and more particularly to a data transmission system having a receiving station equipped with a receiving circuit capable of data transmission regardless of variations in load impedance characteristics over the transmission wire to which devices of various impedance characteristics are randomly connected.

FIG. 1 of the accompanying drawings illustrates a general data transmission system comprising a transmitting station 1, a transmission wiring or lines 2, a load 3, and a receiving station 4. Under normal conditions, the load on the transmission wiring 2 is subjected to small variations. Therefore, the presence or absence of a signal can easily be detected by a voltage developed across a load impedance ZR' in the receiving station.

Power wiring transmission is normally employed for reducing the system cost. With a variety of devices connected randomly to power wiring or lines, the level of detected signal voltages across the load impedance becomes quite small if $|ZL'| << |ZS'|$ (where ZS' is the load impedance in the transmitting station and ZL' the load impedance). At this time, however, the current flowing through the transmission wiring is substantially at maximum.

SUMMARY OF THE INVENTION

With the foregoing prior difficulty in view, it is an object of the present invention to provide a receiving circuit capable of transmitting data to a receiving station over transmission wiring in a data transmission system irrespective of variations in load impedance characteristics.

Another object of the present invention is to provide a receiving circuit for determining the presence or absence of a signal in a receiving station in a system for transmitting and receiving data over transmission wiring by summing a voltage and a current.

According to the present invention, a data transmission system comprises a transmitting station, transmission wiring or lines, and a receiving station. The receiving station has a receiving circuit capable of coupling currents from the transmission lines by way of magnetic coupling of coils and is also capable of coupling voltages from the transmission lines by way of connection to the transmission wiring.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be better understood from the detailed description given hereinbelow and the accompanying drawings, which are given by way of illustration only, and thus are not limitative of the present invention and wherein.

DESCRIPTION OF THE PREFERRED EMBODIMENT

Figure 1:
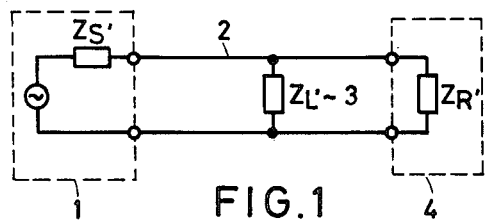
FIG. 1 is an equivalent circuit diagram of a general data transmission system.
Figure 2:
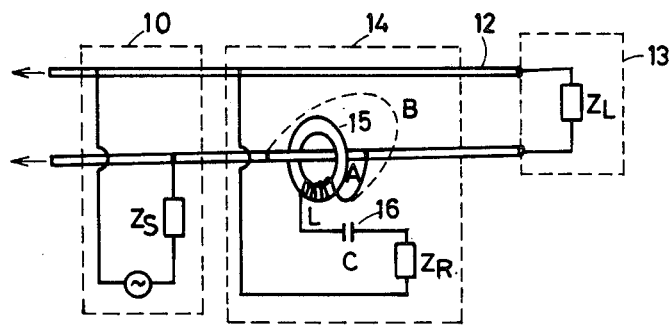
FIG. 2 is a circuit diagram of a data transmission system according to an embodiment of the present invention.

FIG. 2 is a circuit diagram of a transmitting and receiving unit in a data transmission system according to the present invention. The transmitting and receiving unit comprises a transmitting station 10, a receiving station 14, a transmission wiring or lines 12, and a load 13.

Winding L of coils 15 are connected to lines 12 and pick up current signals flowing through the transmission wiring 12 by way of coupling of magnetic fluxes. The coils 15 also serve to pick up voltage signals by being connected to the transmission wiring 12. A capacitor 16 and the coils 15 constitute a series-connected resonance circuit. The capacitor 16 serves to pick up high frequencies dependent on signals transmitted over the transmission wiring 12 while rejecting other frequency components such as power supply freqencies (50/60 Hz).

The coils 15 may be connected to the transmission wiring 12 on either side of the core as shown by either the solid line A or the dotted line B.

Figure 3:
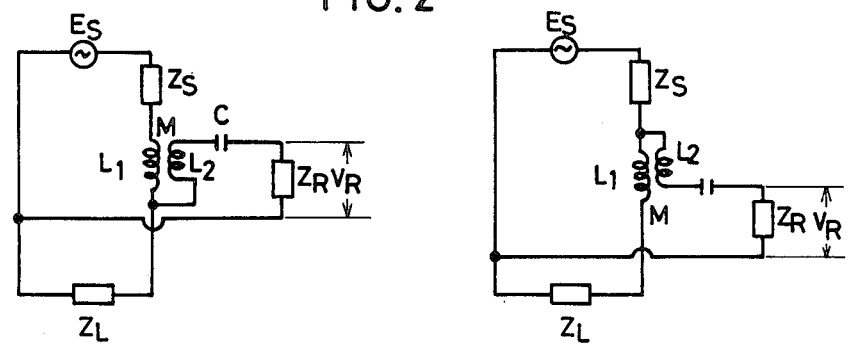
FIG. 3 is an equivalent circuit diagram of the arrangement in which the circuit of FIG. 2 is connected as shown by the solid line.

FIG. 3 shows an equivalent circuit of the transmitting and receiving unit in which the circuit arrangement of FIG. 2 is connected as illustrated by the solid line A.

A voltage VR across a load impedance ZR in the receiving station can be expressed by the following equation:

$$VR = \frac{(ZL \pm j\omega M) \cdot ZR}{(ZS + ZL + j\omega L1)\left(j\omega L2 + \frac{1}{j\omega C} + ZR + ZL\right) - (ZL \pm j\omega M)^2} \cdot ES \quad (1)$$

where the signs $\pm$ are determined by the direction in which the winding L is wound, ZS the load impedance in the transmitting station, ZL the load impedance, L1, L2 the numbers of turns of the windings L, C the capacitance of the capacitor 16, and M the mutual inductance of the coils.

If the load impedance $|ZR|$ in the receiving station is selected to be higher than the impedances of the other components, the following expressions can be established in view of the fact that the winding L1 (line 12) has a single turn and the winding (the winding L of coil 15) L2 and the capacitor C cause series resonance with respect to a carrier frequency:

$$|ZR| \gg |ZS|, |ZL| \gg |\omega L1|, \qquad (2)$$

$$|\omega M| \gg |\omega L1|, \omega L2 - \frac{1}{\omega C} \approx 0$$

By simplifying the equation (1) with the expressions (2) taken into account, $$VR \approx \frac{ZL \pm j\omega M}{ZL + ZS} \cdot ES \qquad (3)$$

$$\text{When } ZL \longrightarrow \infty, VR \approx ES \qquad (4)$$

$$\text{When } ZL \longrightarrow 0, VR \approx \pm \frac{j\omega M}{ZS} \cdot ES \qquad (5)$$

Thus, when the effect of the load is small, the receiving station receives a voltage having substantially the same level as that of a transmitted voltage. When the effect of the load is large, a voltage signal dependent on the current flowing through the transmission wiring can be produced. Under ordinary conditions, a voltage signal can always be obtained due to a combination of both of the load effects.

Figure 4:
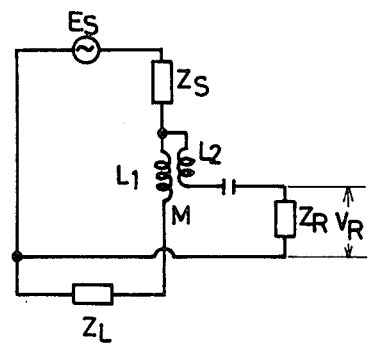
FIG. 4 is an equivalent circuit diagram of the arrangement in which the circuit of FIG. 2 is connected as shown by the dotted line.

FIG. 4 shows an equivalent circuit of the transmitting and receiving unit in which the circuit arrangement of FIG. 2 is connected as illustrated by the dotted line B.

A voltage VR across the load impedance ZR in the receiving station can be expressed by the following equation:

$$VR = \frac{\{ZL + j\omega(L1 \pm M)\}ZR \cdot ES}{(ZS + ZL + j\omega L1)\left\{ ZL + ZR + j\omega(L1 + L2 \pm 2M) + \frac{1}{j\omega C} \right\} - \{ZL + j\omega(L1 \pm M)\}^2} \qquad (6)$$

With the inequalities (2) in view, the equation (6) becomes:

$$VR \approx \frac{ZL \pm j\omega M}{ZL + ZS} \cdot ES \qquad (7)$$

The equation (7) is the same as the equation (3).

As is apparent from the equation (3) or (7), the voltage across load impedance VR in the receiving station may be increased by: (i) making the impedance ZS as small as possible, and (ii) making the mutual inductance M as large as possible. The mutual inductance M is given by:

$$M = K \sqrt{L1 \cdot L2} \quad (0 < K \leq 1)$$

Since the coil L1 (line 12) has a predetermined turn (single turn), the mutual inductance M can be increased by:

(i) coupling the coils L1, L2 closely with each other (K→1), and (ii) increasing the inductance of the coil L2 (increasing the number of turns of the secondary winding L of coil 15).

Figure 5:
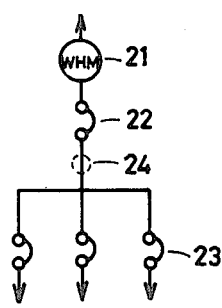
FIG. 5 is a system diagram showing an application in which the present invention is incorporated.

A power supply system for a single house in a multiple dwelling house is shown in FIG. 5. The power supply system has a watt-hour meter 21, a main breaker 22, a subbreaker 23 connected to connected to various electric appliances 23. Where data is to be transmitted between houses in such a multiple dwelling house, the receiving circuit according to the present invention may be incorporated in a receiving station 24 (FIG. 5) for data reception without being affected by the impedance characteristics of the electric appliances in the house.

With the arrangement of the present invention, as described, the receiving station has a receiving circuit that is simultaneously capable of detecting current and voltage signals by way of the magnetic coupling of detection coils to the transmission lines. This allows data to be transmitted irrespective of variations in the load impedance characteristics over transmission wiring to which devices of varying impedance characteristics are connected. A data transmission system with the receiving circuit of the invention is of particular advantage when used for power wiring data transmission characterized by a reduced system cost.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In a system for transmitting data signals from a transmitting station over a transmission line to a receiving station, the transmission line having a variable load impedance caused by one or more load devices connected thereto, a data detection circuit in said receiving station comprising:

(a) current detector means magnetically coupled to said transmission line for detecting current signal components of said data signals therein;

(b) voltage detector means directly coupled to said transmission line for generating voltage signal components of said data signals; and (c) output impedance means for simultaneously receiving said current signal components of said data signal and said voltage signal components of said data signal, and for developing an output signal voltage across the impedance means from said current and voltage signal components of said data signals;

whereby said output signal voltage is generated with a sufficient signal strength to be detectable irrespective of the impedance of the variable load impedance.

2. The system of claim 1, wherein said voltage detector means includes a coil in series between a portion of said transmission line and said output impedance means; and said current detector means includes a core magnetically coupled to said portion of said transmission line, said coil being wound around said core.

3. The system of claim 2, further including capacitor means in series with said coil and forming a series resonant circuit therewith, said resonant circuit being tuned to selectively pass only said data signals.

4. The system of claim 1, wherein said transmission line is a conventional A.C. power supply line and said load devices are power utilization devices connected to said power supply line.

* * * * *